United States Patent [19]
Campbell

[11] 4,197,055
[45] Apr. 8, 1980

[54] VERTICAL AXIS WINDMILL

[76] Inventor: James S. Campbell, 74 Sleepy Hollow La., Orinda, Calif. 94563

[21] Appl. No.: 855,223

[22] Filed: Nov. 28, 1977

[51] Int. Cl.² ............................................. F03D 3/06
[52] U.S. Cl. .................................... 416/119; 416/140
[58] Field of Search ........... 416/119, 140, 117, 240 A, 416/111, 140 R

[56] References Cited

U.S. PATENT DOCUMENTS

| 177,057 | 5/1876 | Bowles | 416/140 R |
|---|---|---|---|
| 226,357 | 4/1880 | Saccone | 416/119 |
| 272,489 | 2/1883 | Sherwood | 416/119 |
| 755,497 | 3/1904 | Hyatt | 416/118 |
| 955,305 | 4/1910 | Bailey | 416/17 |
| 1,139,103 | 5/1915 | Clade | 416/119 |
| 1,149,875 | 8/1915 | Vansyoc | 416/118 |
| 1,535,585 | 4/1925 | Dyer | 416/118 |
| 2,044,794 | 6/1936 | Kisevalter | 416/119 |
| 2,085,411 | 6/1937 | Biehn | 416/117 |
| 2,403,564 | 7/1946 | Stein | 290/44 |
| 2,655,604 | 10/1953 | Hutter | 290/55 |
| 4,130,380 | 12/1978 | Kaiser | 416/119 X |

FOREIGN PATENT DOCUMENTS

| 507161 | 9/1920 | France | 416/119 |
|---|---|---|---|
| 571577 | 5/1924 | France | 416/119 |
| 1014530 | 8/1952 | France | 416/111 |
| 2277994 | 2/1976 | France | 416/41 |
| 32802 | 8/1921 | Norway | 416/132 B |
| 18482 | of 1897 | United Kingdom | 416/117 |
| 2680 | of 1902 | United Kingdom | 416/119 |
| 131958 | 9/1919 | United Kingdom | 416/140 |
| 772908 | 4/1957 | United Kingdom | 416/41 |

Primary Examiner—Everette A. Powell, Jr.

[57] ABSTRACT

A vertical axis windmill involving a rotatable central vertical shaft having horizontal arms pivotally supporting three sails that are free to function in the wind like the main sail on a sail boat, and means for disabling the sails to allow the windmill to be stopped in a blowing wind.

16 Claims, 11 Drawing Figures

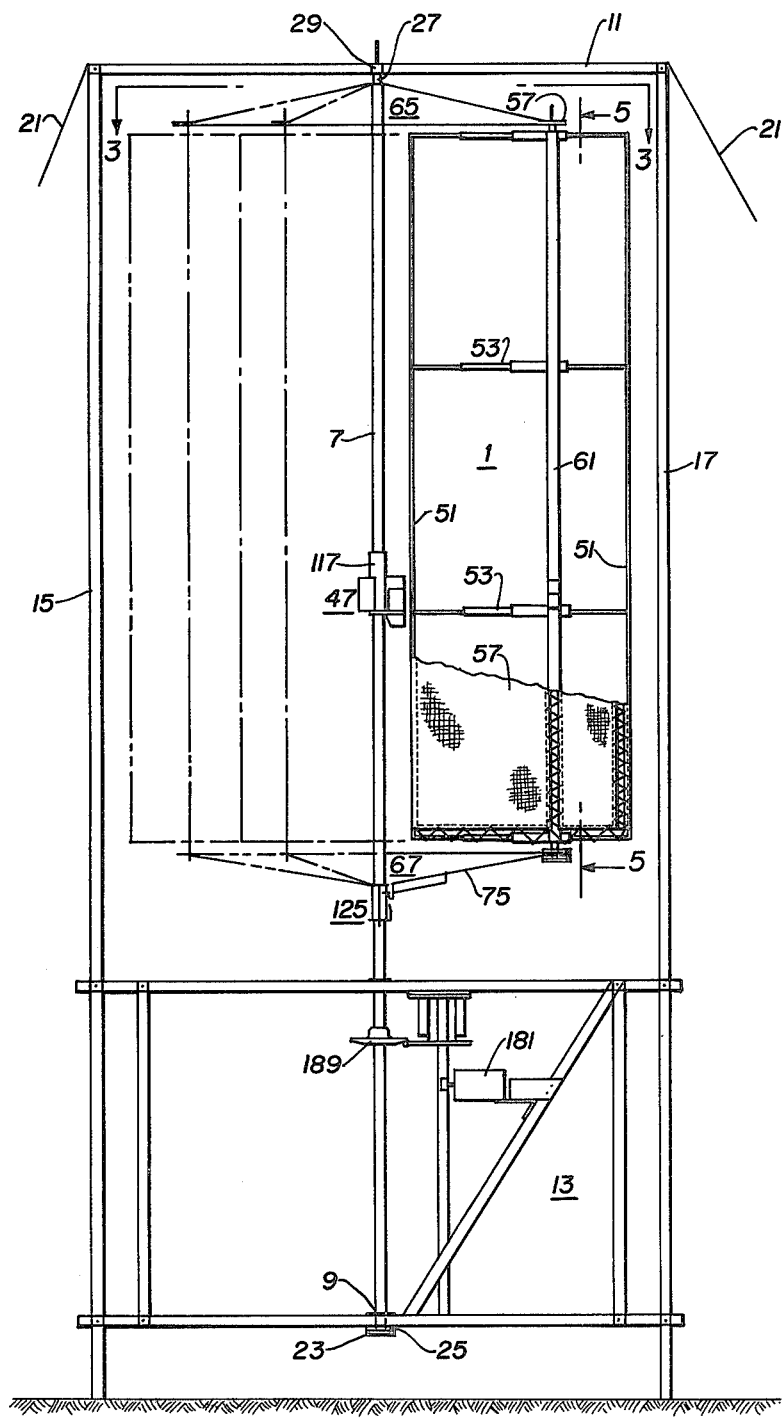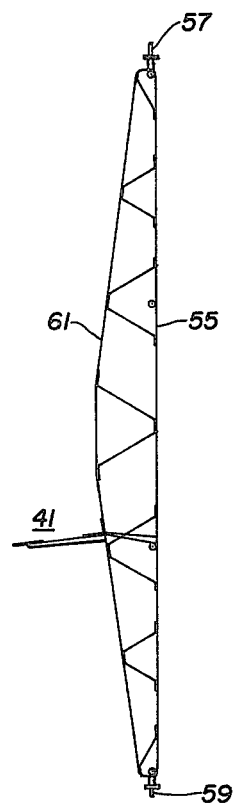
Fig. 1
Fig. 5

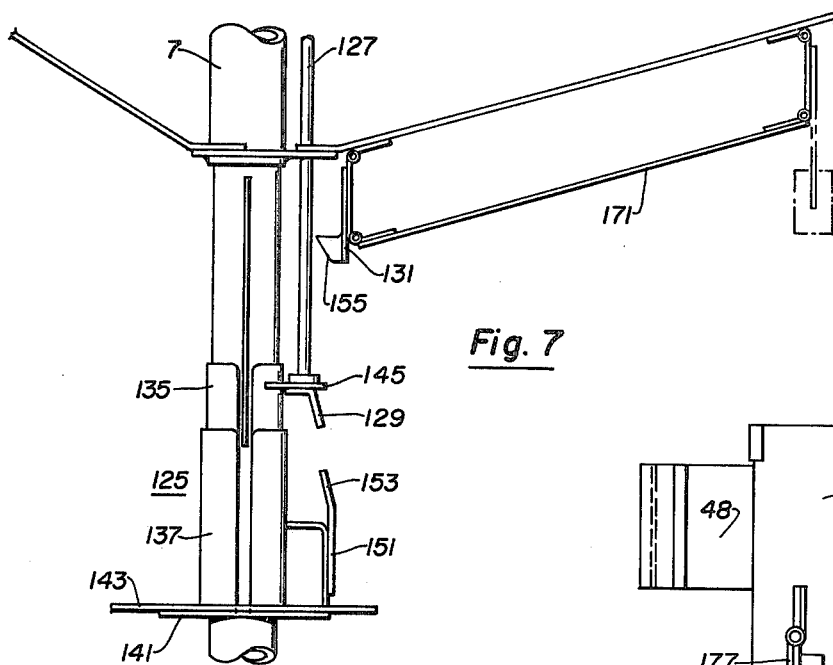
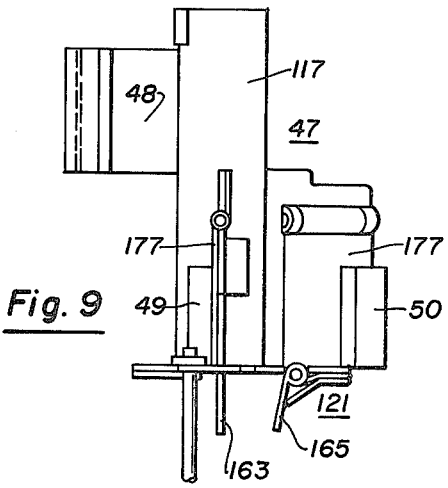
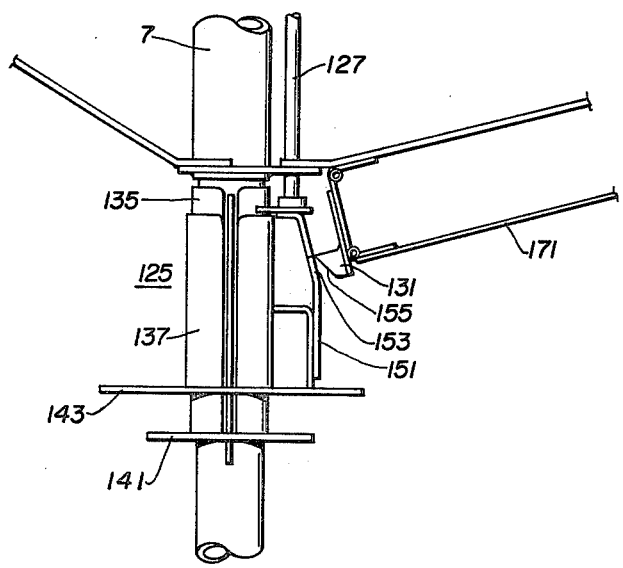
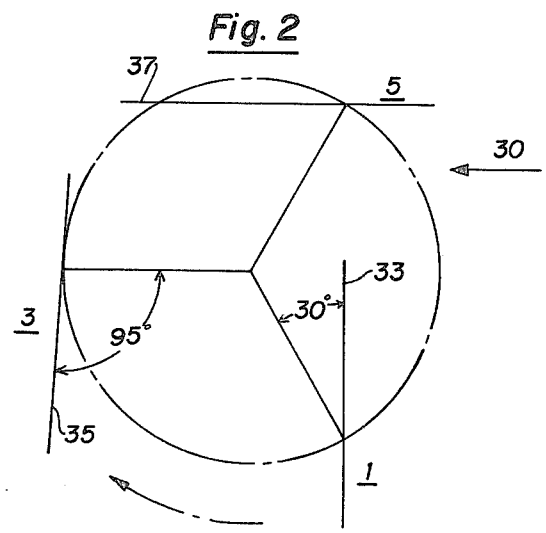

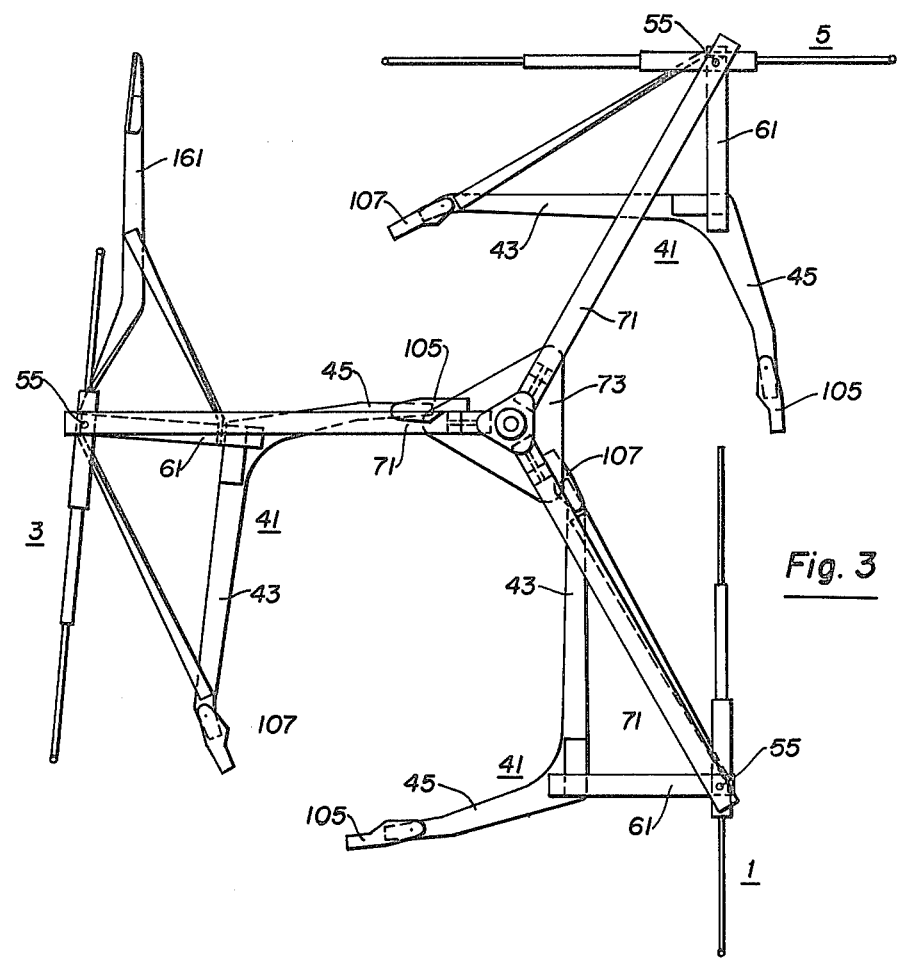
Fig. 3
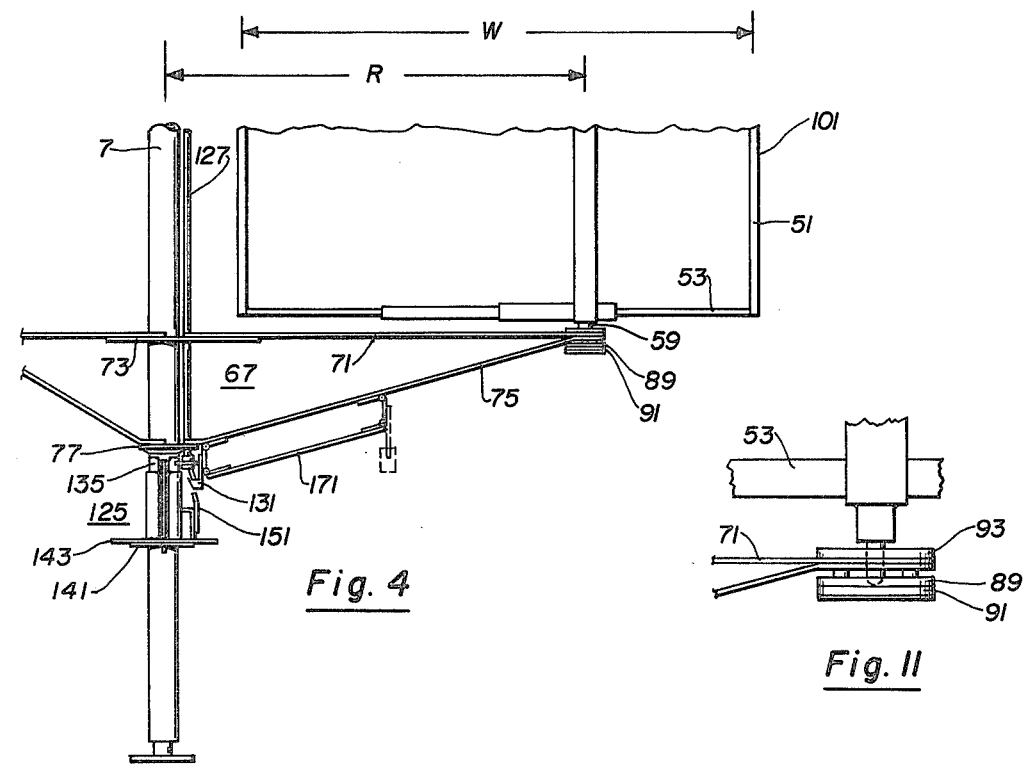
Fig. 4
Fig. 11

VERTICAL AXIS WINDMILL

My invention relates to windmills, and in particular to a Chinese type vertical axis windmill.

The idea of the Chinese vertical axis windmill is over 300 years old, but did not spread into general use throughout the rest of the world because of its high inefficiency and impracticality.

There are not an abundance of references; however, a good description of the Chinese windmill is given in "Science and Civilization in China", by Joseph Needham, Vol. IV, part 2, entitled "Mechanical Engineering". Also, a Chinese vertical axis windmill pumping brine is illustrated in Plate 1 of "Generation of Electricity of Wind Power", by E. W. Golding.

All noted references to the Chinese windmills show them making use of eight sails around a vertical shaft, the whole structure, generally being crudely constructed. Because of mechanical strength limitations, the sails are also generally relatively small in wind-intercepting area and low in height. The limits within which the sails can pivot are usually controlled by measured lengths of rope fastened between the sail supports and the edge of the sail.

Among the objects of my invention are:

(1) To provide a novel and improved vertical axis windmill;

(2) To provide a novel and improved vertical axis windmill with an optimum number of sails;

(3) To provide a novel and improved vertical axis windmill with optimum sail pivoting limits;

(4) To provide a novel and improved vertical axis windmill that can develop a high degree of efficiency;

(5) To provide a novel and improved vertical axis windmill that can be safely stopped while in a blowing wind;

(6) To provide a novel and improved vertical axis windmill that has an optimum ratio of said width divided by sail rotational radius;

(7) To provide a novel and improved vertical axis windmill with means of producing electricity even at slower rotational speeds.

Additional objects of my invention will be brought out in the following description of a preferred embodiment of the same, taken conjunction with the accompanying drawings, wherein;

FIG. 1 is a front view in elevation of the Chinese type windmill in its preferred form.

FIG. 2 is a diagrammatic view of the functioning sails of the invention of FIG. 1.

FIG. 3 is a view through the plane 3—3 of FIG. 1 depicting in section, operating relationships between windmill elements.

FIG. 4 is a side view in elevation showing a portion of the windmill sail assembly and central vertical axis.

FIG. 5 is a view in section through plane 5—5 of FIG. 1 showing the strength reinforcing truss.

FIG. 6 is a view in elevation of a stop-operation assembly in releasing position.

FIG. 7 is a view in elevation of a stop-operation assembly in released position.

FIG. 9 is a view in elevation of the stop assembly removed from its functioning position.

FIG. 11 is a view in elevation depicting the bearing arrangement of the sail pivot axis.

Figure 8:
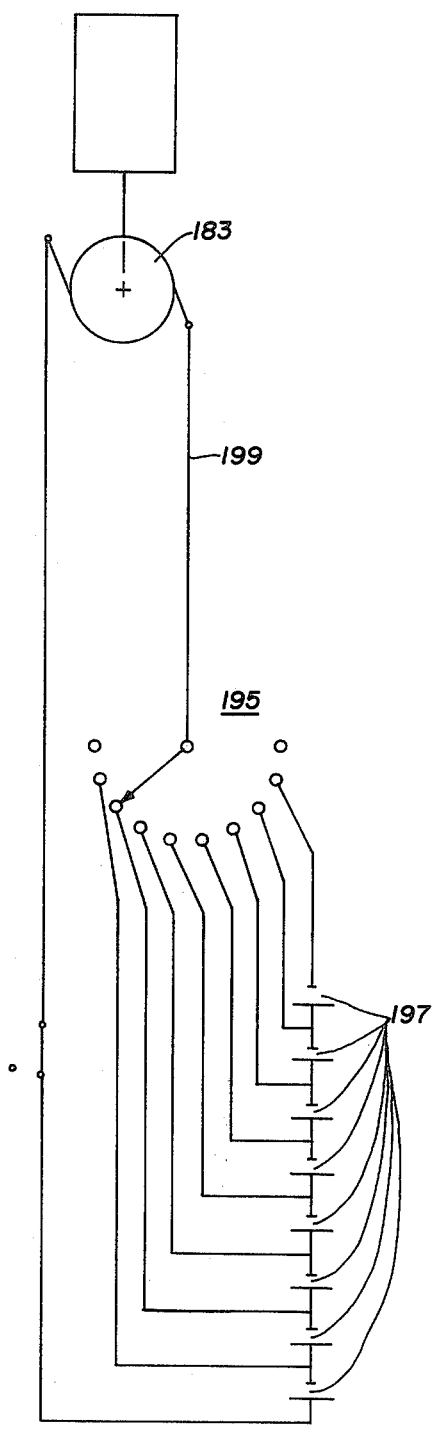
FIG. 8 is a schematic of an electrical field excitation circuit utilized with the invention.
Figure 10:
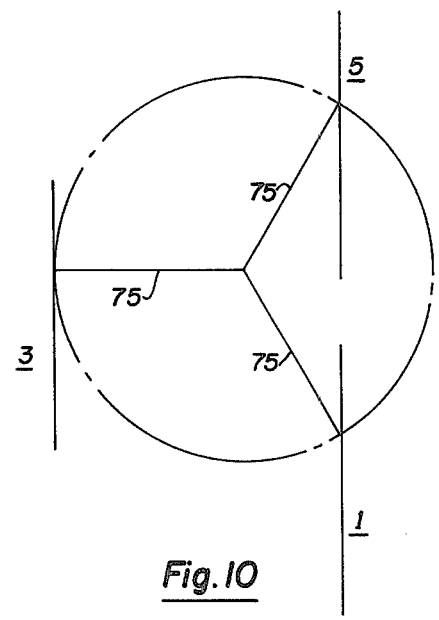
FIG. 10 is a diagramatic view of windmill sails in stopped condition.

Referring to the drawings for details of my invention in its preferred form, the same comprises three sail assemblies 1, 3, 5 rotatably supported by a rotatable central vertical shaft 7. Each sail has its own vertical axis and is allowed to freely pivot within limits about this axis, this limitation being necessary to allow the sail to provide resistance to wind when at either of the pivot limits. The central shaft, having a lower rounded bearing end 9, is supported between a horizontal upper beam 11 and a lower framework assembly 13, the two being spaced by a pair of vertical poles 15, 17 and guyed in position by wires 21 from various points along the upper beam to the ground. To reduce frictional torque, the lower framework assembly includes a solid flat nylon plate 23 under a second nylon plate 25 having a central opening approximately the diameter of the central vertical shaft 7 and through which the shaft is inserted. The rounded bearing end is rotatably supported on the solid flat plate and maintained in position by the limits of the opening. A top journal 27 is rotatable within a nylon sleeve 29 in the upper beam.

The basic operating principle of this vertical axis windmill is the use of a plurality of sails to rotate a central vertical shaft, each sail performing a function similar to that of a main sail of a sail boat. (Refer to FIG. 2 where the wind direction is indicated by arrow 30.) Upwind 33 of the central vertical axis, a sail tacks, or moves perpendicular to the wind. Continuing around, it runs before the wind and then swings about its own pivot axis so that when downwind 35 of the central vertical axis, it again tacks, but this time in a direction opposite to that while upwind. Again, further around 37, the sail luffs, or advances into the wind back to the location which completes the cycle.

To achieve this end, a stop arm assembly 41 having angular stop arms 43, 45 is secured to each sail assembly to be pivotal therewith. A stop assembly 47, including rubber fixed to stop pads 48, 49, 50 to soften impact, is maintained on the central vertical shaft in alignment with the stop arms to keep sail movement within the defined limits.

Each sail assembly includes a rectangular light, aluminum frame 51 with horizontal ribs 53 tapered from an offset pivot 55 and to which dacron sail cloth 57 is securely fastened by standard methods to produce a flat sail surface. The offset pivot 55 includes upper and lower journals 57, 59 and a strength-reinforcing truss 61 projecting perpendicular to the sail surface in the plane of the pivot axis and comprises a framework of aluminum to prevent yielding of the sail in the direction of its length. With this type of strength-reinforcing truss, adequate sail bending strengths between upper and lower journals can easily be provided and a sail height divided by sail width ratio (H/W) can be made very large without a substantial increase in cost. This H/W ratio should be as large as possible in order to maximize the amount of energy obtained from the wind.

Each sail is pivotally supported between an upper radial arm assembly 65 and lower radial arm assembly 67, each comprising a radial arm 71 radiating from an apex of a triangular bracket 73 about the central vertical shaft. An angular bracing arm 75 is attached from the free end of the radial arm back to a ring 77 on the central vertical shaft. The free end of the lower arm includes an opening approximately the size of the relatively small diameter offset pivot journal 59 and is aligned, preferably spaced, over a similar opening in a flat nylon plate 89 that is coupled to and above a solid flat nylon plate 91. Another similar flat plate 93, having a similar opening, is aligned over the upper surface of the support arm to prevent the lower rounded journal, when inserted from becomming disengaged. Again, the rounded end of the lower journal bearing on the flat nylon plate, reduces frictional torque as in the central vertical shaft bearing described above.

A nylon sleeve in the free end of the upper radial support arm 65 for insertion of the upper journal 57, maintains vertical alignment of the sail assembly.

The optimum position of the sail vertical pivot axis, was determined experimentally to be approximately ⅔ the distance of the width of the sail with the widest part of the sail toward the central vertical shaft. With the sail pivot axis located at the sail vertical leading edge 101, a location similar to that used on a sail boat, sail movement was quite extensive, as were the forces developed against the stop arms when the sails reached their limiting positions. This vertical pivot axis was moved increasingly toward the sail center until windmill efficiency started to lower and rotation in light winds lessened. Windmill operation was found to be optimum when the sail vertical pivot axis was located approximately ⅓ the sail width from its vertical leading edge.

All illustrations in the above reference show Chinese windmills having eight sails. Experimentation showed that three equally spaced sails obtained essentially the same amount of energy from the wind as a greater number of equally spaced sails. Two sails spaced 180 degrees apart also operate fairly well with the exception that rotational velocity of the windmill was not constant throughout a complete revolution. On this basis, the optimum number of sails was determined as three.

Experimentation also showed that there is a preferred relationship between the width (W) of the sail and the radius (R) of the sail pivot axis from the central vertical shaft. Different width sails were installed, and with other factors constant, windmill rotational speed in revolutions per minute were monitored. The higher r.p.m's were achieved with a W/R ratio ranging approximately from 1 to 1.5. This was selected therefore as an optimum W/R range.

The location of the two angular limits between which a sail is free to swing or pivot during its operation, serve also as the two functioning positions of the sail. When a sail is upwind of the windmill vertical axis and tacking, it is located at one of its angular limits. This is called the upwind limiting position. Similarly, when a sail is down wind of the windmill vertical axis and tacking, it is at its downwind limiting position. During operation, a sail should pivot between the two positions through an angular range which is as small as possible and yet consistant with optimum efficiency. It has been found that the arc through which the sail is free to pivot during operation is 65 degrees from an optimum upwind limiting position at a 30 degree angle measured from a line between the sail pivot axis and the central vertical axis of the windmill.

To set these limits, the angular stop arm assembly 41 has two free ends, and is attached at its vertex to the sail truss 61 and pivots therewith. The free ends of the angular arm have adjustable tips 105, 107 that contact the rubber covered pads on the stop assembly on the central vertical shaft to adjust the angle through which the sail may rotate. The adjustable tips allow for changes in this angle.

This stop assembly includes a radiating non-movable stop pad 48, preferably welded to the central vertical shaft. The other pads 49, 50 equally spaced radially from the non-movable pad, are welded to a sleeve 117 imposed on the central vertical shaft. This sleeve has a vertical slot in its upper portion in alignment with the non-movable pad, such that the sleeve may be moved up along the non-movable pad to bring the other two pads into the same plane therewith; such plane being also that of the tips of the stop arms.

To provide complete control of the windmill, it is necessary to provide means for stopping rotation even in the face of a blowing wind. By removing two of the stop pads 49, 50 from their functioning positions, the non-movable pad 48, still in functioning relationship with the third sail, enables the windmill to slowly turn until one of the sails can be captured radially in locking means 121. This sail now functions as a vane in the wind and the other sails will line up accordingly.

To achieve this end, there is a cooperation between the stop assembly 47 and a stop operation assembly 125 located conveniently on the central vertical shaft below the sails and connected to the stop assembly by a light rod 127. The stop assembly is held in position by a downward angled member 129 resting on the flat surface of a pivotal latch 131 suspended from one of the lower support arms. The lower assembly includes two concentric sleeves 135, 137 around the central vertical shaft with a disc 141, 143 attached to the lower end of each, the inner sleeve 135 having the smaller discs 141. The inner sleeve is longer than the outer and has an upper bracket 145 for attachment of the lower end of the light rod 127. The larger disc 143 connected to the outer sleeve 137 includes an upper release member 151 with an angled end 153 in alignment with the downward angled member 129 such that when the upward member is raised against a sloping front surface 155 of the pivotal latch, the flat surface is moved from under the downward member, removing support and allowing the light rod and stop assembly to move downward from its operating position.

With the stop assembly lowered, and the two stop pads removed from the plane of the ends of the stop arms, the associated sails are allowed to move freely. One of these sails has a third arm 161 on its arm assembly, a stop operation arm, on a lower plane than the other arms and in position at this time to be caught by the locking means 121 on the lowered stop assembly. This locking means includes a pair of hanging spaced parallel walls 163, 165, one 165 of which is hinged to be movable in the direction of the other. When the stop assembly is lowered and the locking means is in the plane of the stop operation arm, the windmill slowly rotates forward until the stop operation arm 161 pushes past the hinged wall 165 in its only movable direction and becomes locked in the space between the two walls. The sail surface is now held radially so that it functions as a vane in the wind and the other sails line up accordingly (FIG. 11).

To restart the windmill, it is only necessary to push upward on the inner sleeve disc 141, raising both sleeves until the downward angled member on the light rod pushes up past the sloping front surface of the hinged latch and the flat surface of the latch swings back under the angled member. This relatching is assisted by a weighted member 171 biasing the latch in the latching direction; such member, parallel to and pivotably suspended from a lower angular bracing arm. The stop assembly will thus raise back into functional position and release the stop operation arm from the parallel locking walls. Any wind now will slowly rotate forward the two downwind stop arms, which are at this time out of their operating ranges with the ends of both limit arms on the same side of their associated stop pad. To handle this situation, the limit arms are angled so that the two ends of the arm are on different planes. A segment is removed from the lower portion of each pad 49, 50 attached to the sleeve, creating an opening in the plane of the downwind stop arms, but in a lower plane than the upwind arms. A rectangular piece 177, larger than the opening, is hingedly secured over the opening to allow the piece movement in one direction only, so that the downwind arm may pass through the opening in this one direction and be stopped from passing through in the other. This re-establishes the working functional relationships between the stop arms and the stop assembly, and the windmill may again start operation.

This windmill may be used to provide power for many different types of work, however, in my preferred embodiment, it was used to drive a alternator 181 comprising a field coil 183 and an amature, and connected through adequate gearing 189 mounted in the framework below the sails.

Normally it is not until a windmill has reached a high rate of speed that a load is applied because of the high starting tongue of most loads. This is partially true in the case of an alternator due to the resistance created by a wire coil trying to turn in an electrical or magnetic field, this resistance requiring a very high starting tongue to overcome. For this reason, a load is not usually applied during low speeds, and consequently, no useful output is created during times of low velocity winds.

To solve this problem, a direct current voltage, used to excite the field coil as it is turned by the windmill, is varied corresponding to wind velocity, the torque required to rotate the alternator being directly proportional to this voltage. This is accomplished with a manual multiposition rotary switch 195, each position successively adding another battery 197 in series with the field coil circuit 199 as windmill speed increases. In the current embodiment, this field voltage control was done manually, but it could be accomplished by other methods such as automatically under control of a minicomputer or by means of regulating the influence of permanent magnets over the armature.

Two or more windmills also may be mounted in a row and supported between a common horizontal upper beam and a lower gearing and alternator frame. They may all be connected mechanically to drive one electrical generator or alternator. A row of windmills such as this should be located perpendicular to prevailing wind directions.

While the invention has been described as applied to action with wind, it will be appreciated that the idea of this windmill may be adopted for use in a flow of water such as in a relatively slow flowing river or tide flow. The sails or vanes may be extended down into water, and the electrical generator may be located safely protected above the water surface. Also, since the invention may be utilized in other ways, we accordingly do not desire to be limited in our protection to the specific details illustrated and described, except as may be necessitated by the prior art.

I claim:

1. A vertical axis windmill comprising a central vertical shaft, means rotatably supporting said shaft to render said shaft capable of producing work when turning, radial arms extending from said central vertical shaft and supporting a plurality of freely rotatable sail assemblies, each of said assemblies including a vertical axis, means pivotally securing said axis to one of said radial arms, and means limiting pivotable movement of each assembly about its pivot axis to substantially less than one half of a full revolution said limiting means including a stop arm assembly secured to each of said sail assemblies in contact alignment with a stop assembly on said central vertical shaft, whereby when portions of said stop arm assembly contact said stop assembly it will limit further pivotable movement of its associated sail assemblies and permit direct drive to said central vertical shaft.

2. A vertical axis windmill in accordance with claim 1, characterized by said stop arm assembly comprising two angular arms in alignment with pads secured to said stop assembly on said central vertical shaft to define limits of said sail pivotal movement.

3. A vertical axis windmill in accordance with claim 1, characterized by said sail assembly pivotal movement traversing an optimum arc of approximately 65 degrees from an angle of approximately 30 degrees measured from a line between said sail pivot axis and said central vertical shaft.

4. A vertical axis windmill comprising a central vertical shaft, means rotatably supporting said shaft to render said shaft capable of producing work when turning, radial arms extending from said central vertical shaft and supporting a plurality of freely rotatable sail assemblies, each of said sail assemblies including a vertical turning axis, means pivotally securing each said sail assembly axis to one of said radial arms, said sail assembly comprising a frame occupying a plane, sail fabric supported by and within said frame to form a planar sail, and reinforcing means on said vertical turning axis of said sail assembly thereby reinforcing said sail in the direction of said axis.

5. A vertical axis windmill in accordance with claim 4, characterized by said said reinforcing means comprising a truss projecting perpendicular to said sail planer surface, whereby, said truss strengtens said sail in the direction of sail height to allow greater sail height for improved windmill performance.

6. A vertical axis windmill in accordance with claim 1, characterized by each of said sail assemblies having height and width and said sail vertical axis positioned at approximately one third of said sail width for obtaining optinmum windmill efficiency and rotatability in light winds.

7. A vertical axis windmill in accordance with claim 1 characterized by said plurality of freely rotatable sail assemblies optimumly numbered three to produce the greatest energy efficiency with the least number of sails.

8. A vertical axis windmill in accordance with claim 1 characterized by said sail assemblies including a lower rounded journal on said pivot axis, said radial arms including an opening for receiving said lower rounded journal of approximately the diameter of said journal and in alignment over a flat plate having a similar opening coupled to and above a solid flat plate, whereby, with said rounded journal end inserted through said openings and bearing on said solid flat plate frictional turning torque of said sail assembly is reduced.

9. A vertical axis windmill in accordance with claim 1 characterized by each of said sail assemblies having width W and pivotal securing means located on said radial arms at distance R from said central vertical shaft, values for Width W and distance R that provide an optimum W/R ratio ranging from approximately 1 through 1.5 thereby allowing for maximum windmill rotational speed.

10. A vertical axis windmill in accordance with claim 1 characterized by means utilizing said stop assembly for stopping operation of said windmill.

11. A vertical axis windmill in accordance with claim 10, characterized by means for stopping operation of said windmill including means for removing said stop assembly from contact alignment with said angular stop arms to allow free pivoting of said sail assemblies and means for capturing and locking from movement one of said freely pivoting sail assemblies, whereby, said captured sail assembly will function as a vane to line up with the prevailing wind and allow other of said sail assemblies to line up parallel to said captured assembly.

12. A vertical axis windmill in accordance with claim 11, characterized by means for capturing and locking from movement one of said sail assemblies including a pair of hanging spaced walls depending from said stop assembly with one of said walls hingedly movable in one direction toward the other, and with a stop operation arm on one of said sail assemblies in the plane of said locking means when said stop assembly is removed from contact alignment with said stop arms, whereby, said stop operation arm may be pushed by the prevailing past said hinged wall in one direction to be caught and locked in said space between said walls.

13. A vertical axis windmill in accordance with claim 12, characterized by one of said stop pads being securely fixed to said central vertical shaft in contact alignment with one of said stop arms, whereby, when said stop assembly is removed from contact alignment with said stop arms, one of said assemblies may remain active to maintain slow windmill movement to aid in capture of one of the other of said sail assemblies.

14. A vertical axis windmill in accordance with claim 13, characterized by selected portions of said stop pads including openings therethrough covered by larger pieces hinged to one side allowing passage therethrough in one direction only, and said stop arm assembly having stop pad contacting ends in different planes, whereby, upon restoring said stop assembly to contact alignment with said stop arms, said arms may align themselves in the operational side of said stop pads.

15. A vertical axis windmill comprising a central vertical shaft, means rotatably supporting said shaft to render said shaft capable of producing work when when turning; radial arms extending from said central vertical shaft and supporting three freely rotatable sail assemblies, each of said assemblies having width W and a vertical pivot axis located at approximately one third of of said sail width, means pivotally securing said sail axis to one of said radial arms, and means limiting pivotable movement of each assembly about its pivot axis to substantially less than one half of a full revoulation said means including a stop arm assembly secured to each of said sail assemblies in contact alignment with a stop assembly on said central central vertical shaft.

16. A vertical axis windmill comprising a central vertical shaft, means rotatably supporting said shaft to render said shaft capable of producing work when turning, radial arms extending from said central vertical shaft and supporting three freely rotatable sail assemblies, each of said assemblies having width W and including a vertical axis, means pivotally securing said axis to one of said radial arms at a distance R from said central vertical shaft, values for width W and distance R that provide an optimum W/R ratio of 1 through 1.5, and means limiting pivotable movement of each assembly about its pivot axis to substantially less than one half of a full revolution, said means including a stop arm assembly secured to each of said sail assemblies in contact alignment with a stop assembly secured to said central vertical shaft.

* * * * *